(12) United States Patent
Gager et al.

(10) Patent No.: US 6,490,776 B1
(45) Date of Patent: Dec. 10, 2002

(54) METHOD OF FORMING A SINGLE-SHEET APPLIQUE

(76) Inventors: Robert Brady Gager, 8251 Hidden Creek Ct., Flushing, MI (US) 48433; Andrew Michael Rheude, 1443 Bush Creek Dr., Grand Blanc, MI (US) 48439; Rushikesh Kirti Amin, 7020 Camelot Dr., Canton, MI (US) 48187

( * ) Notice: Subject to any disclaimer, the term of this patent is extended or adjusted under 35 U.S.C. 154(b) by 0 days.

(21) Appl. No.: 09/250,715

(22) Filed: Feb. 16, 1999

(51) Int. Cl.[7] .............................................. B60K 37/00
(52) U.S. Cl. ............................ 29/458; 296/70; 180/90; 493/59; 493/68; 493/355
(58) Field of Search ........................... 29/458; 493/324, 493/325, 59, 63, 68, 69, 355, 352, 396, 395; 296/70; 180/90

(56) References Cited

U.S. PATENT DOCUMENTS

| | | | | |
|---|---|---|---|---|
| 1,288,132 A | * | 12/1918 | Nagle | .......................... 493/59 |
| 4,428,030 A | * | 1/1984 | Baliozian | ..................... 362/18 |
| 4,560,602 A | * | 12/1985 | Draper | ......................... 428/79 |
| 5,100,090 A | * | 3/1992 | Drower | ....................... 248/248 |

FOREIGN PATENT DOCUMENTS

| | | | |
|---|---|---|---|
| EP | 590190 | * | 4/1994 |
| FR | 2731958 | * | 9/1996 |
| JP | 11058509 | * | 3/1999 |

* cited by examiner

*Primary Examiner*—David P. Bryant
*Assistant Examiner*—Jermie E. Cozart
(74) *Attorney, Agent, or Firm*—Jimmy L. Funke; Stefan V. Chmielewski (57) ABSTRACT

In a preferred embodiment, a single-sheet applique for use in a multi-level display, including: a first portion formed in a single planar sheet of applique material; a second portion formed in the single planar sheet of applique material; at least a first segment formed in the single planar sheet of applique material and joining the first portion and the second portion; and the at least a first segment being arranged so as to permit the first portion and the second portion to be folded away from each other such that the first portion will lie in a plane different from a plane in which the second portion lies.

4 Claims, 7 Drawing Sheets

METHOD OF FORMING A SINGLE-SHEET APPLIQUE

BACKGROUND OF THE INVENTION

1. Field of the Invention

The present invention relates to appliques generally and, more particularly, but not by way of limitation, to a novel single-sheet, multi-level applique that is particularly useful in vehicle dashboards and a novel method of manufacturing the same.

2. Background Art

While the present invention is described with reference to application in vehicle dashboards, it will be understood that it is applicable as well to any application in which multi-level appliques are employed.

Conventionally, multi-level appliques are employed in vehicle dashboards to provide graphics surrounding gauges and other information displays. For example, an analog speedometer includes a pointer that extends through a portion of the dashboard. An applique on which is printed a scale of speeds is attached to that portion of the dashboard surrounding the pointer such that the pointer will point to the speed at which the vehicle is traveling. Similarly, appliques may be used in conjunction with indicators of engine temperature, oil pressure, fuel tank level, engine speed, alternator voltage output, and whatever other operating indicators may be employed. An applique surrounding the instrument display may also be employed. Additionally, symbols visible through one or more of the appliques may be employed, such as a symbol indicating that a seat belt is not fastened, for example.

The appliques may be adhesively attached to portions of the dashboard or they may be held in place by means of one or more retainers that hold the appliques in place without the use of an adhesive.

According to one manufacturing technique, such appliques are individually cut and silk screen-printed. For example, a dashboard display may include one applique for the fuel gauge, another applique for the speedometer, a third applique for the engine temperature gauge, and a fourth applique for surrounding the entire instrument display. One reason for producing the appliques separately is that the appliques for the fuel gauge, the speedometer, and the engine temperature gauge are applied at a level that is set farther into the dashboard than the surrounding applique. This creates a three-dimensional visual effect in the vehicle instrumentation which not only is attractive, but which also facilitates differentiating one display from another, as opposed to having all displays presented on the same plane.

While there are aesthetic reasons for using separate appliques, such a technique creates manufacturing problems and additional cost. These come about by virtue of the fact that the separate silk-screening printing operations employed to apply the graphics to the appliques lead to inconsistent variations in colors between the various appliques, due to differences in chemistry and temperature and/or humidity conditions when the appliques are produced.

According to another technique, a flat applique is produced and then the applique is pressed with a bladder to dish the applique or to form other surfaces. This technique is relatively expensive because of lower production yields due to breakage. There are also more quality problems, since, when an applique is cut, burrs are formed which are easier to remove from flat appliques in a deburring operation than are burrs on formed appliques. Since economics dictate that quality control inspection take place only after the applique is finished, the burr problem is not discovered until after forming has taken place and the burrs must, consequently, be removed from the formed appliques.

Accordingly, it is a principal object of the present invention to provide a multi-level applique and method of manufacture that avoid problems inherent in conventional multi-level applique displays.

It is further object of the invention to provide a method of manufacturing such an applique that is economical.

It is another object of the invention to provide such an applique that provides for a multi-level display with a single-sheet.

It is an additional object of the invention to provide such an applique that may have only planar surfaces.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a single-sheet applique for use in a multi-level display, comprising: a first portion formed in a single planar sheet of applique material; a second portion formed in said single planar sheet of applique material; at least a first segment formed in said single planar sheet of applique material and joining said first portion and said second portion; and said at least a first segment being arranged so as to permit said first portion and said second portion to be folded away from each other such that said first portion will lie in a plane different from a plane in which said second portion lies.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

Figure 1:
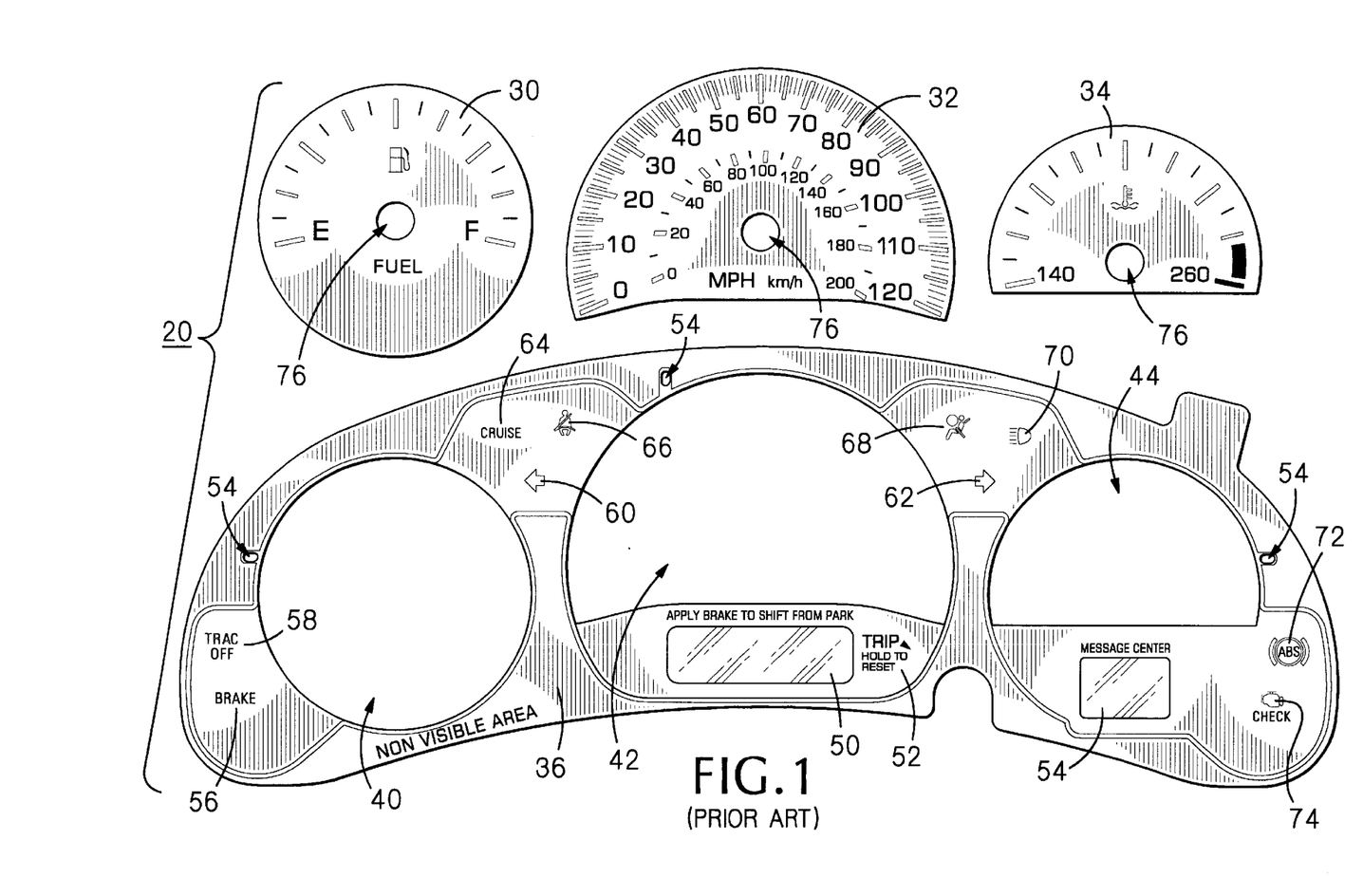
FIG. 1 is a front elevational view of a set of conventional, individual appliques used in a multi-level instrument display in a vehicle dashboard.

FIG. 1 illustrates a set of conventional appliques that may be employed in a multi-level display in a vehicle dashboard, the set of appliques being generally indicated by the reference numeral 20. Set 20 includes a first applique 30 which has thereon a scale to be used in conjunction with a fuel tank level readout, a second applique 32 which has thereon scales to be used in conjunction with a speedometer readout, a third applique 34 which has thereon a scale to be used in conjunction with an engine temperature readout, and a fourth applique 36 which is to surround the first three appliques. First, second, and third appliques 30, 32, and 34 would typically be adhesively applied to a first level in a vehicle dashboard (not shown) and fourth applique 36 would typically be adhesively applied to a second level of the dashboard, the second level being closer to the operator of the vehicle than the first level of the dashboard. Accordingly, fourth applique 36 is provided with a first opening 40 through which first applique 30 would be visible, a second opening 42 through which second applique 32 would be visible, and a third opening 44 through which third applique 34 would be visible. Fourth applique 36 also includes a relatively clear area 50 through which will be displayed a regular odometer and a trip odometer (neither shown), an area 52 for the operator of the vehicle to press to reset the trip odometer, and a relatively clear area 54 through which the operator of the vehicle may receive messages. Also provided in fourth applique 36 are locator elements 60 that assist in properly aligning the fourth applique on the second level of the dashboard. Of course, more than two levels may be provided in the dashboard. When installed in a dashboard, the area on fourth applique 36 indicated as "NON VISIBLE AREA" would be concealed by a trim piece.

Also provided on fourth applique 36 are symbols known as "dead fronts" that are visible only when lighted from behind. These dead fronts include a BRAKE symbol 56 to indicate that the parking brake is set, a TRAC OFF symbol 58 to indicate that the vehicle traction control system is off, left and right turn symbols 60 and 62, respectively, a CRUISE symbol 64 to indicate that the vehicle cruise control system is on, a symbol 66 to indicate that a seat belt is not fastened, a symbol 68 to indicate that an air bag is not operational, a symbol 70 to indicate that the high headlight beams are on, a symbol 72 to indicate that the automatic brake system is operational, and a symbol 74 to indicate that the engine computer should be checked.

First, second, and third appliques 30, 32, and 34 also have circular cutouts 76 located generally centrally thereof to accommodate pointer shafts (not shown).

In a conventional method of manufacture, appliques 30, 32, 34, and 36 are die-cut from a suitable, usually clear, material. Then, each of appliques 30, 32, 34, and 36 is silk-screened with the graphic material indicated. Typically, the graphic material includes different colors and shadings. A particular problem with this method of manufacture, as noted above, is that undesirable color variations may be exist between the appliques, due to variations in chemistry, temperature, and/or humidity between the times the various appliques are produced.

Figure 2:
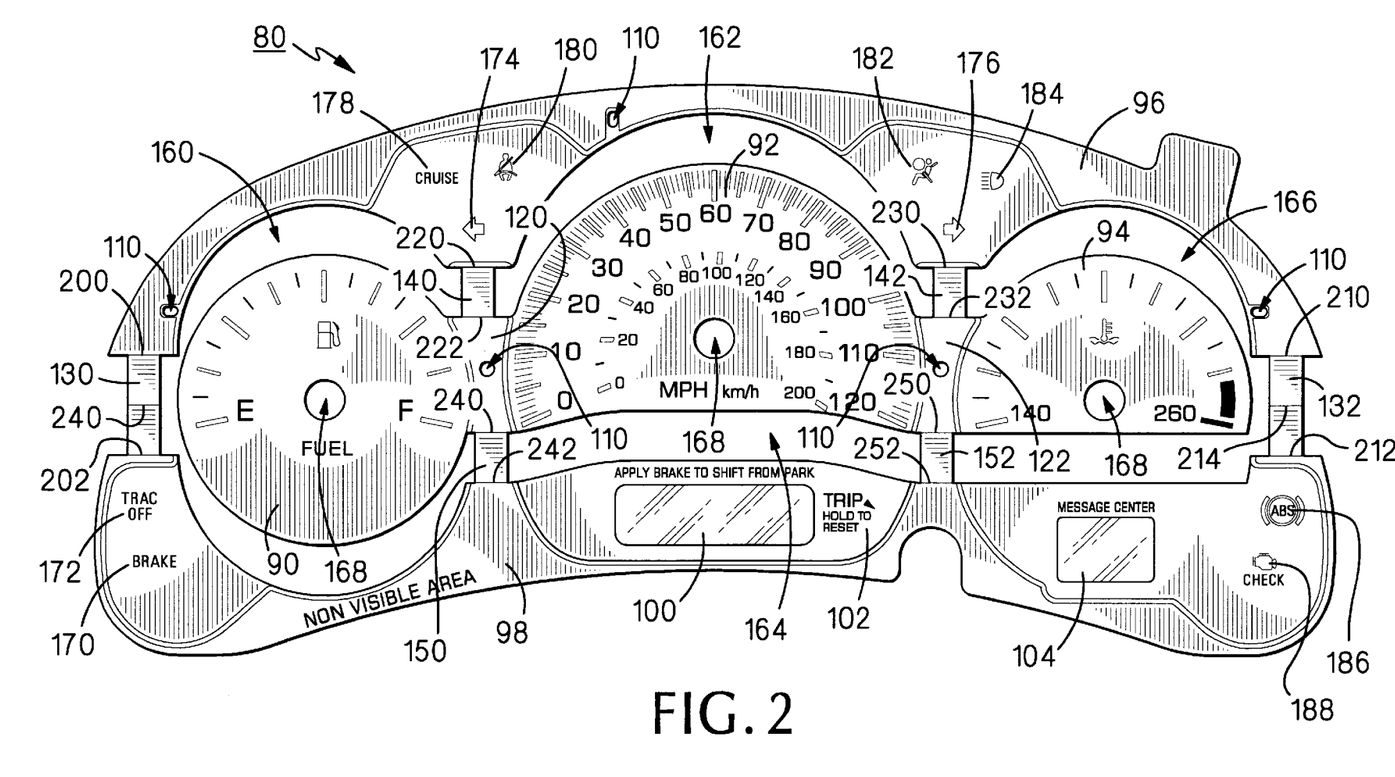
FIG. 2 is a front elevational view of a single-sheet applique according to a first embodiment of the present invention.
Figure 3:
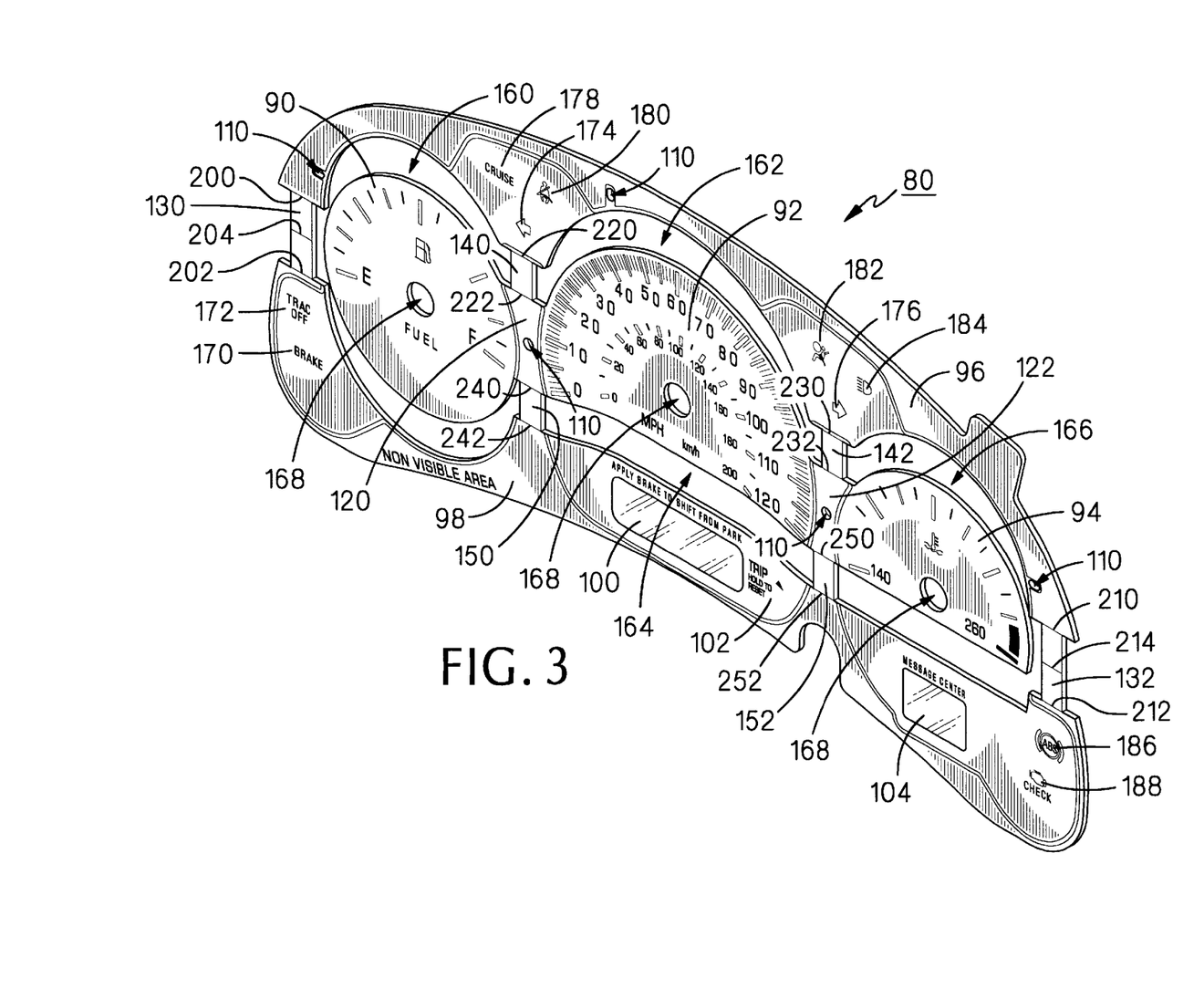
FIG. 3 is an isometric view of the single-sheet applique of the first embodiment of the present invention.

FIGS. 2 and 3 illustrate a single-sheet applique according to a first embodiment of the present invention, the applique being generally indicated by the reference numeral 80. FIG. 2 is a front elevational view of the applique and FIG. 3 is an isometric view thereof. Each view shows each element of applique 80, so reference may be made to either of the figures.

Applique 80 includes a first portion 90 having a scale for use in conjunction with a fuel tank level readout, corresponding to first applique 30 in set 20 (FIG. 1), a second portion 92 having a scale for use in conjunction with a speedometer readout, corresponding to second applique 32 in set 20, and a third portion 94 having a scale for use in conjunction with an engine temperature readout, corresponding to third applique 34 in set 20, and upper and lower fourth portions 96 and 98, respectively, which are to surround the first, second, and third portions, corresponding to fourth applique 36 in set 20. Lower fourth portion 98 includes a relatively clear area 100 through which will be visible a regular odometer and a trip odometer (neither shown), an area 102 which may be pressed by the operator of the vehicle to reset the trip odometer, and a relatively clear area 104 through which the operator of the vehicle may view messages. Upper fourth portion 96 also includes locator elements 110.

First portion 90 is attached to second portion 92 by means of a first joining portion 120, while third portion 94 is joined to the second portion by means of a second joining portion 122. Upper and lower fourth portions 96 and 98 are joined, respectively, by means of first and second vertical segments 130 and 132. Upper fourth portion 96 is joined, respectively, to first and second joining portions 120 and 122 by means of third and fourth vertical segments 140 and 142, while lower fourth portion 98 is joined, respectively, to the first and second joining portions by means of fifth and sixth segments 150 and 152. First and second segments 130 and 132 are of substantially the same length and third, fourth, fifth, and sixth segments are of substantially the same length, although equal lengths are not required for practicing the present invention.

An open area 160 is provided substantially surrounding first portion 90, an open area 162 is provided above second portion 92, an open area 164 is provided below the second portion, and an open area 166 is provided substantially surrounding third portion 94. Circular cutouts 168 are provided in first, second, and third portions 96, 92, and 94 located generally centrally thereof to accommodate therein shafts of pointers (not shown).

An important feature of the present invention is that all the foregoing, non-graphical elements of applique 80 are produced in a single, planar sheet of material.

Also included on upper and lower fourth portions 96 and 98 are the following dead fronts: a BRAKE symbol 170 to indicate that the parking brake is set, a TRAC OFF symbol 172 to indicate that the vehicle traction control system is off, left and right turn symbols 174 and 176, respectively, a CRUISE symbol 178 to indicate that the vehicle cruise control system is on, a symbol 180 to indicate that a seat belt is not fastened, a symbol 182 to indicate that an air bag is not operational, a symbol 184 to indicate that the high headlight beams are on, a symbol 186 to indicate that the automatic brake system is operational, and a symbol 188 to indicate that the engine computer should be checked. Again, these dead fronts are not visible unless lighted from the rear and, otherwise, those areas appear to be the same color as the surrounding areas.

In the manufacture of applique 80, the applique is die-cut from a single sheet of flexible, generally clear, polycarbonate material, having a thickness of on the order of about 0.020-inch. In the die-cutting operation, in additional to cutting applique 80 from the sheet of polycarbonate material, areas 160, 162, 164, 166, and 168 are cut and removed from the applique. Additionally, and most important to the practicing of the invention, during the die-cutting step or in a separate manufacturing step, horizontal score lines 200 and 202 are formed, respectively, across the top and bottom ends of segment 130 and a horizontal score line 204 is formed across the center of the segment. Similarly, horizontal score lines 210 and 212 are formed, respectively, across the top and bottom ends of segment 132 and a horizontal score line 214 is formed across the center of the segment. Horizontal score lines 220 and 222 are also formed, respectively, across the top and bottom ends of segment 140. Similarly, horizontal score lines 230 and 232, and 240 and 242, and 250 and 252 are formed, respectively, across the tops and bottoms of segments 142, 150, and 152.

Applique 80 is then silk-screened in a single manufacturing operation, placing thereon the graphic elements described above, thus obviating potential problems with the silk-screening of individual elements in separate silk-screening operations.

Figure 4A:
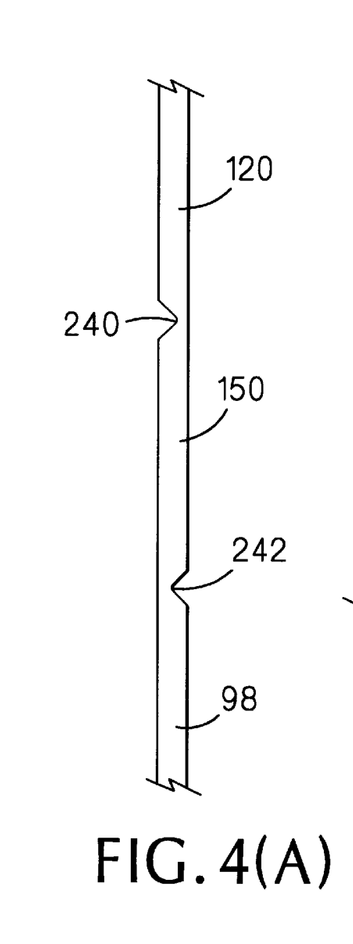
FIGS. 4(A) and 4(B) are side elevational views showing the construction and function of one type of hinge employed in the first embodiment of the present invention.

The score lines formed on the segments described in the foregoing paragraph permit the respective segment to serve as "living hinges" to permit certain elements of applique 80 to be disposed in a plane different from that of other elements of the applique. As applique 80 is formed and as illustrated on FIG. 4(A), joining portion 120, segment 150 and lower fourth portion 98 lie in a common plane, with V-shaped score lines 240 and 242 formed on opposite sides of the segment, the V-shaped score lines comprising grooves extending approximately halfway through the thickness of the segment. V-shaped score lines 240 and 242 permit segment 150 to be folded, as illustrated on FIG. 4(B) at a first right angle with respect to lower fourth portion 98 and at a second right angle with respect to joining portion 120 such that the lower fourth portion and the joining portion lie in different parallel planes. In a similar manner, FIG. 5(A) illustrates upper and lower fourth portions 96 and 98 and segment 132 lying in a common plane as formed from a single sheet of material. However, score lines 210, 212, and 214 formed in segment 132 permit that segment to be folded, as illustrated on FIG. 5(B). In the latter case, rather than the folding operation resulting in upper and lower fourth portions 96 and 98 being offset in different planes, the folding operation results in the upper and lower portions being brought together in a common plane.

Figure 4B:
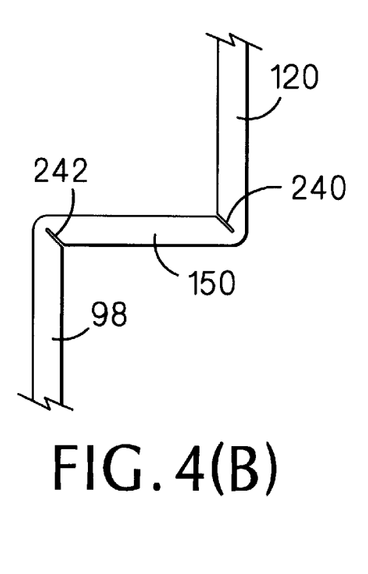
Figures 5A, 5B:
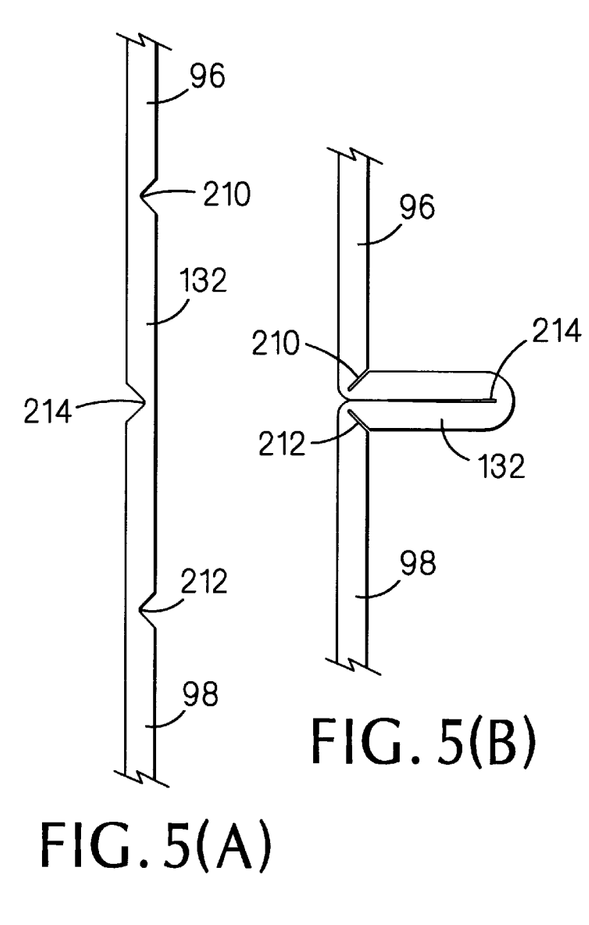
FIGS. 5(A) and 5(B) are side elevational views showing the construction and function of another type of hinge employed in the first embodiment of the present invention.
Figure 6:
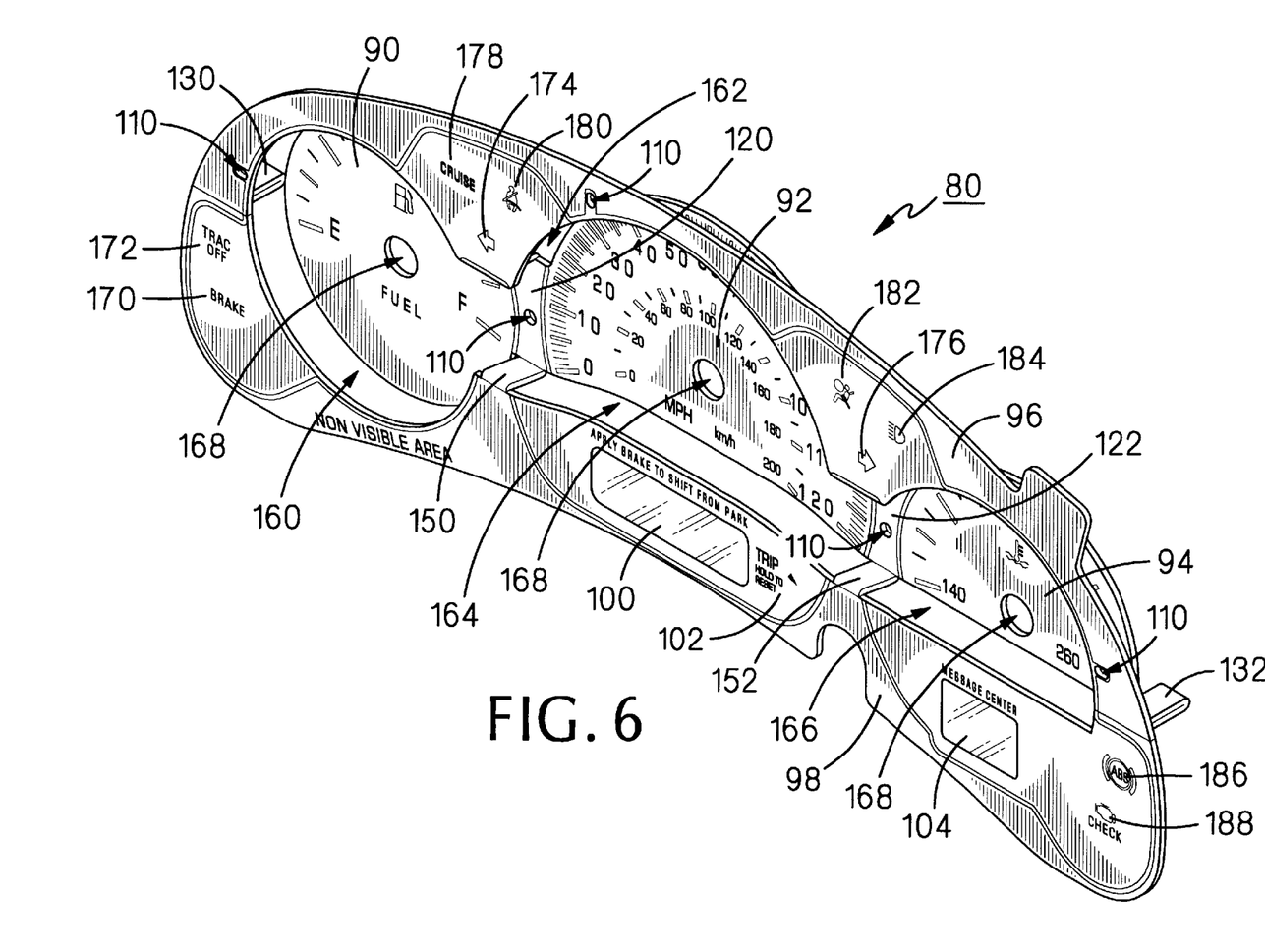
FIG. 6 is an isometric view of the single-sheet applique of the first embodiment of the present invention arranged to provide a three-dimensional effect.

FIG. 6 illustrates applique 80 with all segments folded in the manner illustrated on FIGS. 4(B) and 5(B), with the result that first, second, and third portions 90, 92, and 94 lie in a plane spaced apart from the plane of upper and lower fourth portions 96 and 98, thus presenting a three-dimensional arrangement formed from a planar, single applique. It will be understood that the angles shown on FIGS. 4(B) and 5(B) may be other than right angles and that, although segments 140, 142, 150, and 152 are shown, in the embodiment illustrated, as being of substantially equal length, thus placing first, second, and third portions in a plane parallel to that of upper and lower fourth portions 96 and 98, the segments may be of unequal lengths, thus placing selected elements in non-parallel planes. In the latter case, first, second, and third portions 90, 92, and 94 may, for example, be arranged to lie in a plane at an angle to the plane of upper and lower fourth portions 96 and 98. Additionally, the elements of applique 80 may be arranged to lie in more than two planes.

Figure 7:
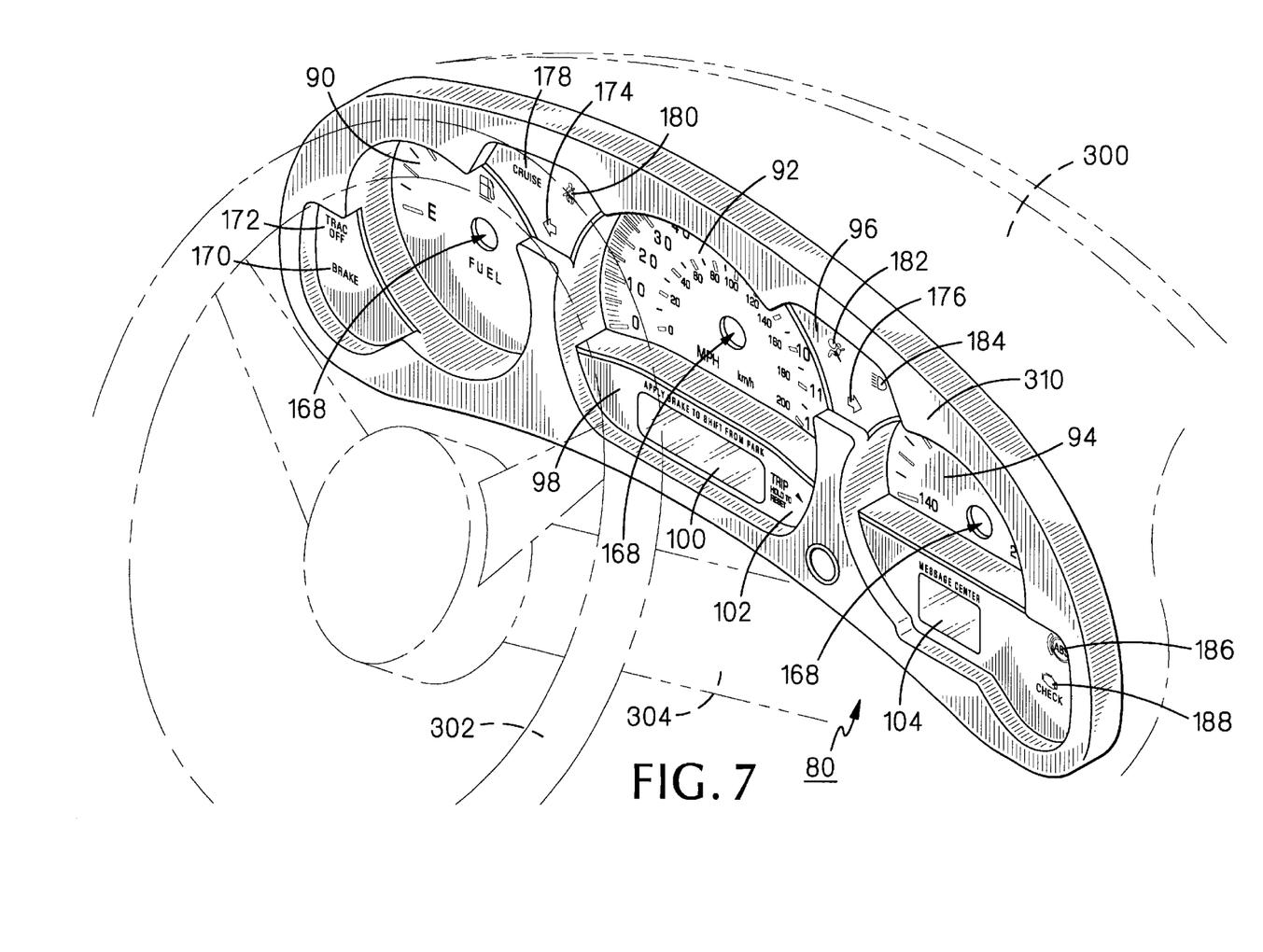
FIG. 7 is an isometric view of the first embodiment of the present invention installed in a dashboard of a vehicle.

FIG. 7 illustrates applique 80 installed in a dashboard 300 of a vehicle having a steering wheel 302 mounted on a steering column 304 (the vehicle not being otherwise shown). Applique 80 has been mounted in dashboard 300 by the conventional method of adhesively attaching the applique to surfaces provided therefor in the dashboard. A trim piece 310 is installed over and around applique 80 to provide a finished appearance and to cover the segments, joining portions, and open areas (FIGS. 2–6) of the applique. Clear lenses (not identified) may be disposed over first, second, and third portions 90, 92, and 94 of applique 80. The arrangement of the present invention achieves the same three-dimensional effect with a single-sheet applique, applique 80, as is achieved with conventional multi-component appliques. Alternatively, trim piece may be arranged to hold applique 80 in place without the use of an adhesive.

Figure 8:
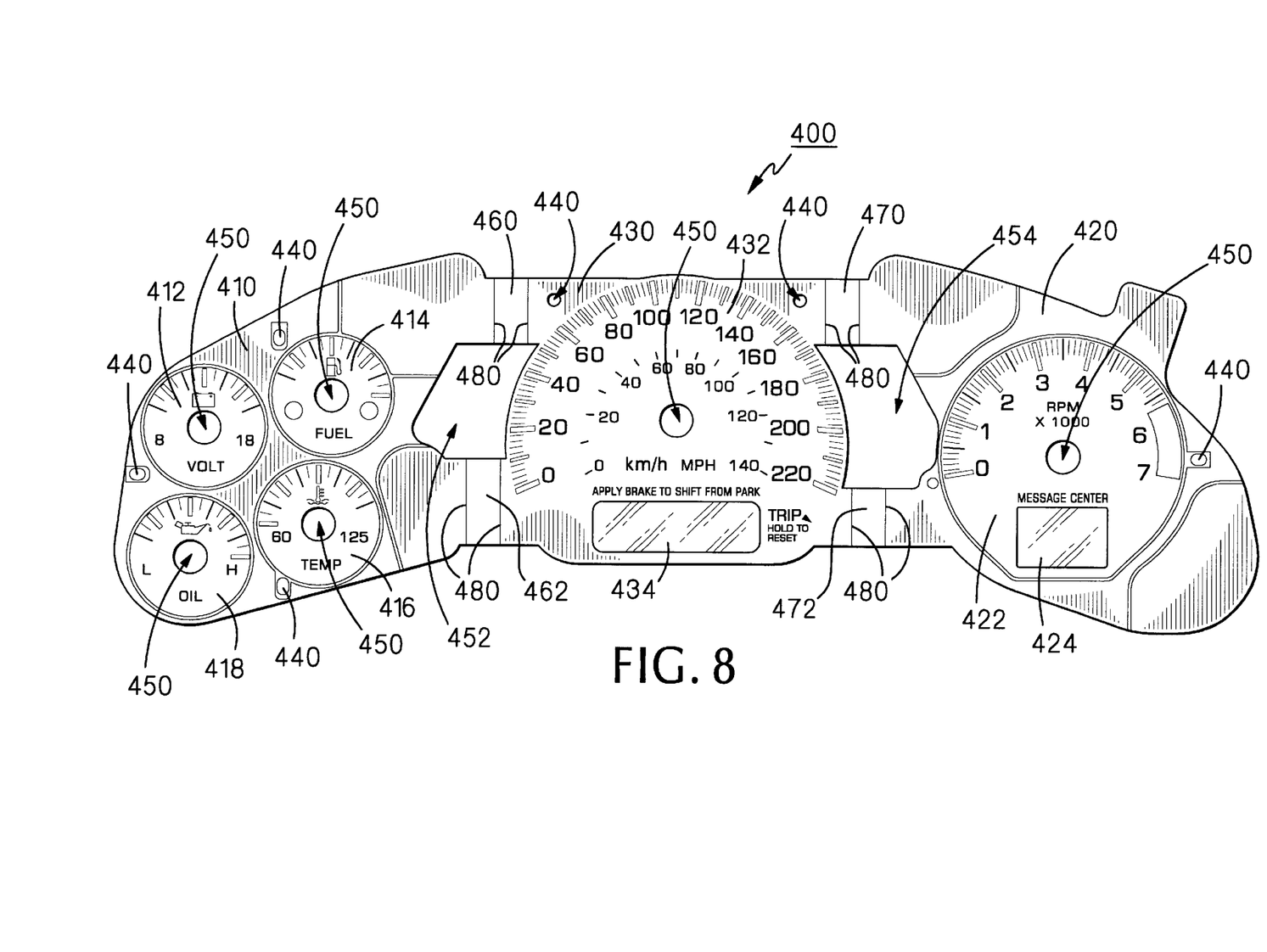
FIG. 8 is a front elevational view of a second embodiment of the present invention.

FIG. 8 illustrates an applique constructed according to another embodiment of the present invention, generally indicated by the reference numeral 400. Applique 400 differs somewhat in structural details from applique 80 (FIGS. 2–7); however, it also permits achieving a three-dimensional effect with a single-sheet.

Applique 400 includes a first portion 410 having therein displays 412, 414, 416, and 418 for use in conjunction with, respectively, an alternator voltage readout, a fuel gauge readout, an engine temperature readout, and an engine oil pressure readout. Applique 400 also includes a second portion 420 having therein a display 422 for use in conjunction with tachometer readout and a relatively clear portion 424 through which the operator of a vehicle may view messages. Applique 400 further includes a third portion 430 having therein a display 432 for use in conjunction with a speedometer readout and a relatively clear portion 434 through which is visible a regular odometer and a trip odometer (neither shown). It will be understood that one or more dead front areas (none shown) may also be provided in applique 400. Locating elements 440 are also provided as shown. Circular cutouts 450 are provided generally centrally of displays 412, 414, 416, 418, 422, and 432 to accommodate therein shafts of pointers (not shown).

An open area 452 is provided between first and third portions 410 and 430, while another open area 454 is provided between second portion 420 and the third portion. First portion 410 is joined to third portion 430 by means of upper and lower segments 460 and 462 disposed, respectively, above and below open area 450, while second portion 420 is joined to the third portion by means of upper and lower segments 470 and 472 disposed, respectively, above and below open area 452. Segments 460, 462, 470, and 472 have vertical score lines 480 formed at the side edges thereof.

As was the case with applique 80 (FIGS. 2–7), the non-graphical elements of applique 400 are formed from a single sheet in a die-cutting operation and, during that operation, or in a separate manufacturing operation, vertical score lines 480 are formed. So arranged, it will be understood that segments 460, 462, 470, and 472 will act as living hinges such that third portion 430 may be bent inwardly of the plane in which first and second portions 410 and 420 lie in order to achieve a three-dimensional effect with a single sheet of material. Segments 460, 462, 470, and 472 are shown as being of substantially equal widths which will result in third portion 430 lying in a plane parallel to the plane in which lie first and second portions 410 and 420.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of forming a single-sheet applique for a multi-level display, comprising the steps of:

(d) providing a single planar sheet of applique material;

(e) cutting said single planar sheet of applique material to form a first portion and a second portion joined by at least a first segment, said at least a first segment being arranged to permit said first portion and said second portion to be folded away from each other such that said first portion lies in a plane different from a plane in which said second portion lies;

(f) silk-screening graphical material onto said single planar sheet of applique material;

(g) folding said first portion and said second portion away from each other such that said first portion lies in a plane different from a plane in which said second portion lies and (e) installing said folded single sheet of applique material in a dashboard of a vehicle, with said first portion placed at a first plane and said second portion placed at a second plane in said dashboard and said first and second planes being at different distances from a position of an operator of said vehicle, and wherein said first and second portions are installed in a single side of said dashboard.

2. A method, as defined in claim 1 wherein: step (b) further includes providing first and second score lines in said at least one segment such that said at least one segment acts as a living hinge to permit said folding away of said first portion and said second portion away from each other.

3. A method, as defined claim 2 further comprising: providing said first and second score lines as V-shaped grooves formed on opposite sides of said at least a first segment.

4. A method, as defined in claim 3, further comprising: providing said V-shaped grooves extending approximately halfway through said at least a first segment.

\* \* \* \* \*